(12) United States Patent
Yoshida

(10) Patent No.: US 6,323,960 B1
(45) Date of Patent: Nov. 27, 2001

(54) FACSIMILE APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/048,846

(22) Filed: Mar. 27, 1998

(30) Foreign Application Priority Data

Mar. 28, 1997 (JP) .................................................. 9-095376

(51) Int. Cl.[7] .................................................. H04N 1/41
(52) U.S. Cl. ................................................ 358/431; 358/433
(58) Field of Search .................................. 358/435, 442, 358/436, 431, 434, 405, 426

(56) References Cited

U.S. PATENT DOCUMENTS

| 4,829,524 | | 5/1989 | Yoshida ................................. 371/32 |
| 5,075,783 | * | 12/1991 | Yoshida et al. ........................ 358/439 |
| 5,127,013 | * | 6/1992 | Yoshida ................................. 371/32 |
| 5,220,439 | | 6/1993 | Yoshida ................................. 358/404 |
| 5,438,427 | | 8/1995 | Yoshida ................................. 358/405 |
| 5,440,405 | * | 8/1995 | Ahmed .................................. 358/435 |
| 5,526,123 | * | 6/1996 | Yoshida et al. ..................... 358/261.3 |
| 5,537,220 | * | 7/1996 | Ezumi et al. .......................... 358/442 |
| 5,668,641 | * | 9/1997 | Tsukamoto et al. .................. 358/436 |

* cited by examiner

Primary Examiner—Cheukfan Lee
(74) Attorney, Agent, or Firm—Fitzpatrick, Cella, Harper & Scinto

(57) ABSTRACT

The objective of the invention is to provide a communication apparatus which can prevent an RTC signal or the like from being divided into two blocks, and can maintain appropriate ECM communications.

When an ECM transmission mode is selected, image information is encoded to transmit a predetermined number of bytes as one frame and a predetermined number of frames as one block. When the volume of information exceeds one block, the remaining information is transmitted as the next partial page. In this case, the information volume for one physical page is checked. If the information volume for one physical page is a specific information volume, the RTC signal or the like is prevented from being divided into the first and second partial pages by deleting or adding information.

10 Claims, 10 Drawing Sheets

FACSIMILE APPARATUS

BACKGROUND OF THE INVENTION

1. Field of the Invention

The present invention relates to a communication apparatus such as a facsimile apparatus or the like that can especially make ECM communications.

2. Related Background Art

A conventional facsimile apparatus based on the ITU-T recommendations encodes an image signal by a predetermined coding scheme, and then adds an RTC signal. 256 bytes of such information form one frame, and 256 frames form one block. Information exceeding 256 frames is divided into a plurality of partial pages upon transmission.

Since the encoded image signal and RTC signal (return to control) are processed as indistinctive information, and are transmitted while being divided in units of frames and blocks (partial pages), the RTC signal is often divided into two blocks (two partial pages).

When the RTC signal extends across two blocks, one physical page is divided into two partial pages. In the first partial page, the RTC signal is transmitted after the image signal, and the protocol signal herein is a PPS-NULL signal. In the next partial page, the RTC signal alone is transmitted, and the protocol signal herein is a PPS-Q (Q: MPS, EOM, or EOP) signal.

Upon reception of the PPS-NULL signal, the receiver should couple the first and second partial pages, and record them as one physical page. However, it was confirmed in communication tests that some facsimile apparatus available from manufacturers other than CANON Inc. record the first partial page as one physical page, and record the second partial page as another physical page (a blank sheet is output as the second page).

The communication tests also revealed the following fact. That is, upon reception of the above-mentioned signal, another facsimile apparatus (not a CANON product) detects the RTC signal by decoding the first partial page, and determines that reception for one physical page is complete. When reception of the next partial page is started, such facsimile apparatus terminates due to errors arising from the absence of effective line information.

SUMMARY OF THE INVENTION

It is, therefore, an object of the present invention to provide a communication apparatus which can prevent an RTC signal and the like from being divided into two blocks, and can maintain appropriate ECM communications even when it communicates with the above-mentioned apparatuses.

DETAILED DESCRIPTION OF THE PREFERRED EMBODIMENTS

Figure 1:
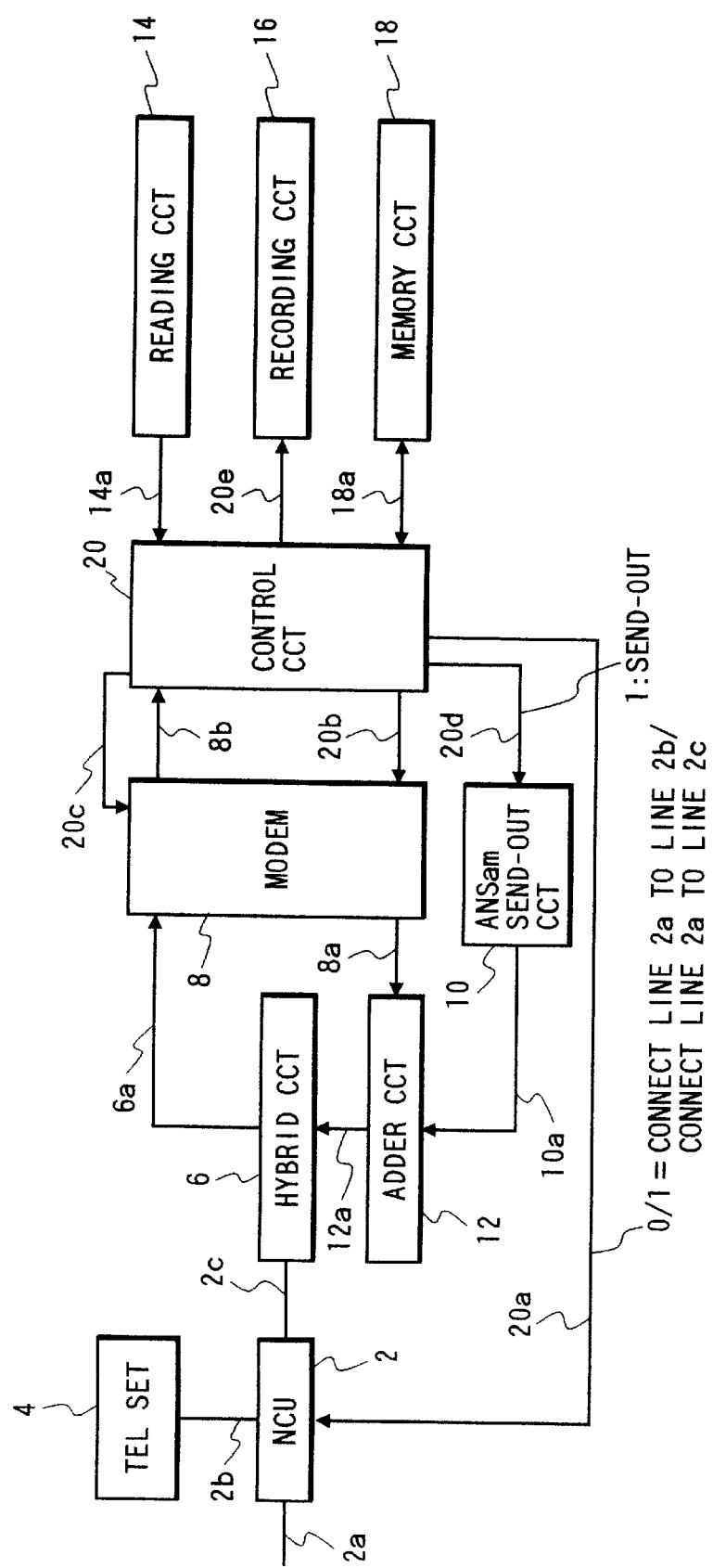
FIG. 1 is a block diagram showing an embodiment of the present invention.
Figure 2:
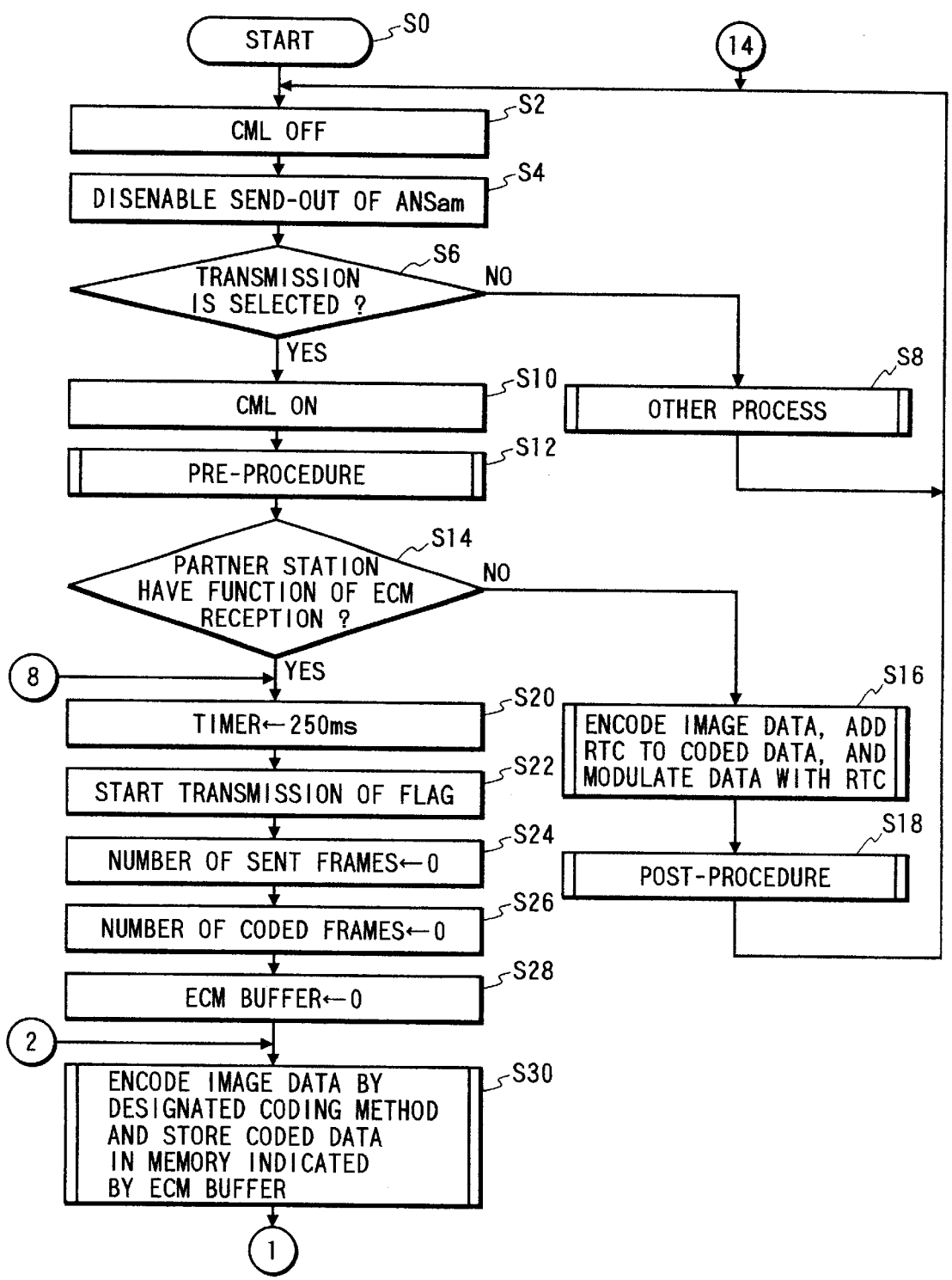
FIG. 2 is a flow chart showing the operation according to the first embodiment of the present invention.
Figure 3:
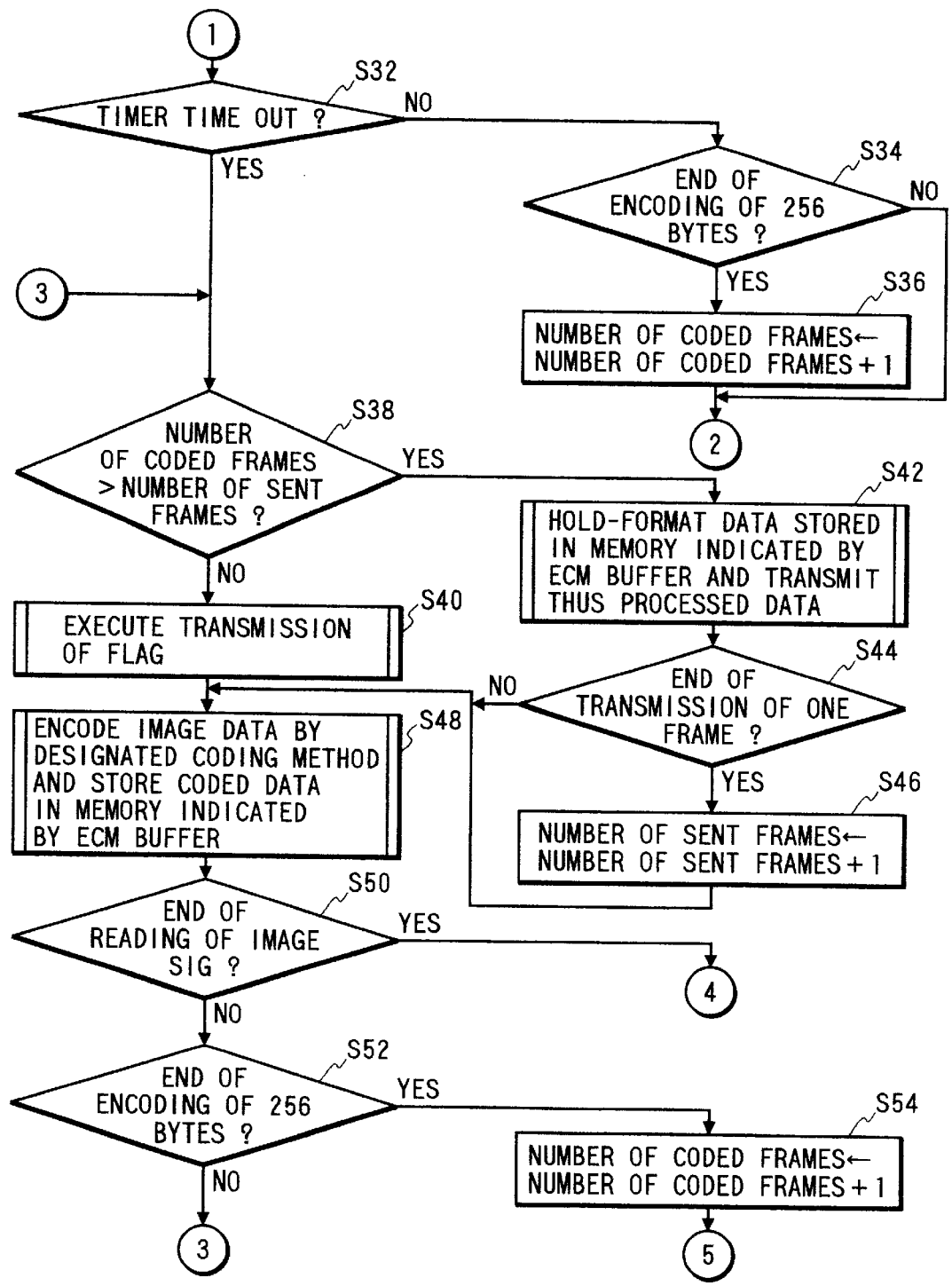
FIG. 3 is a flow chart showing the operation according to the first embodiment of the present invention.
Figure 4:
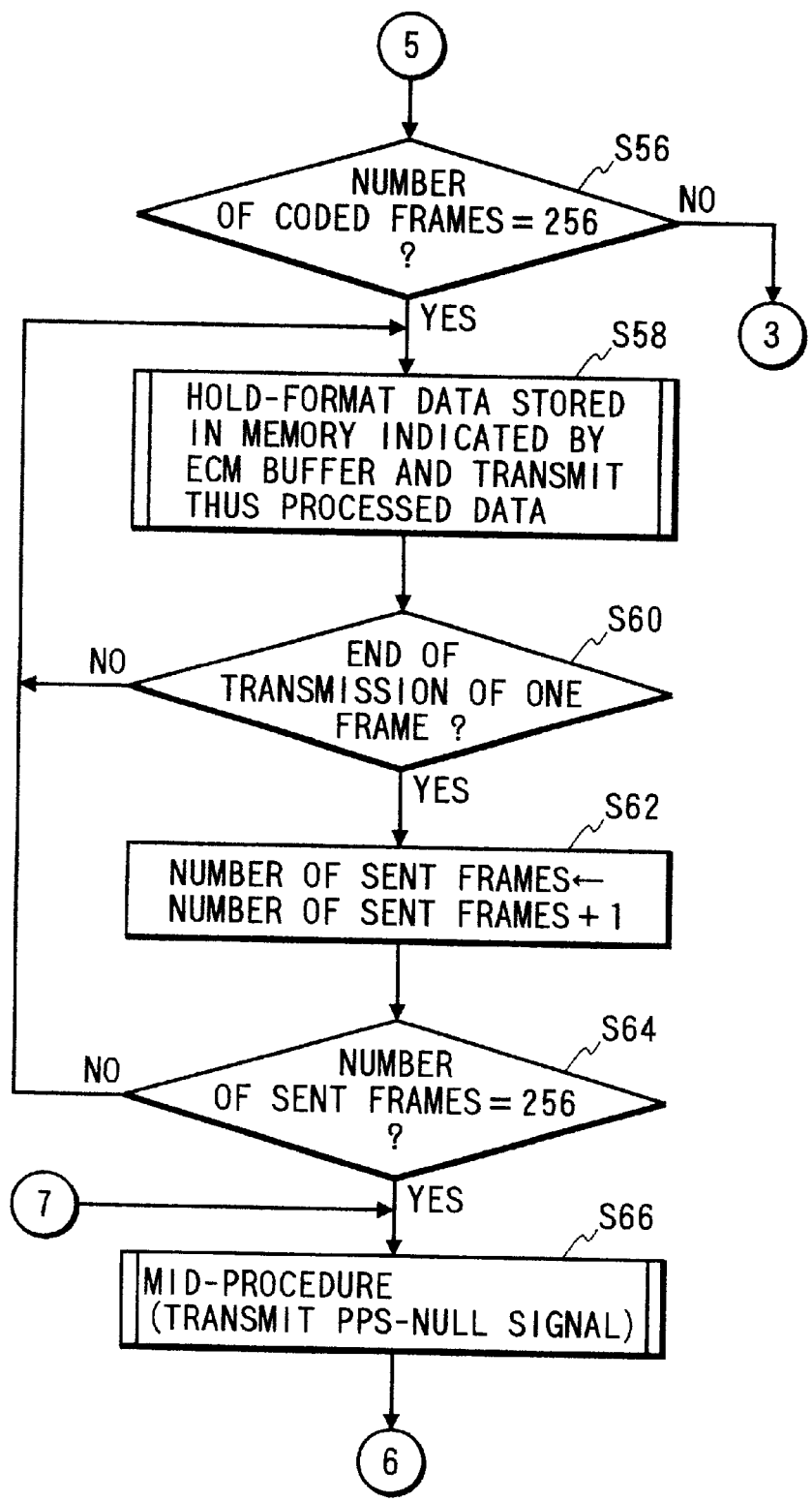
FIG. 4 is a flow chart showing the operation according to the first embodiment of the present invention.
Figure 5:
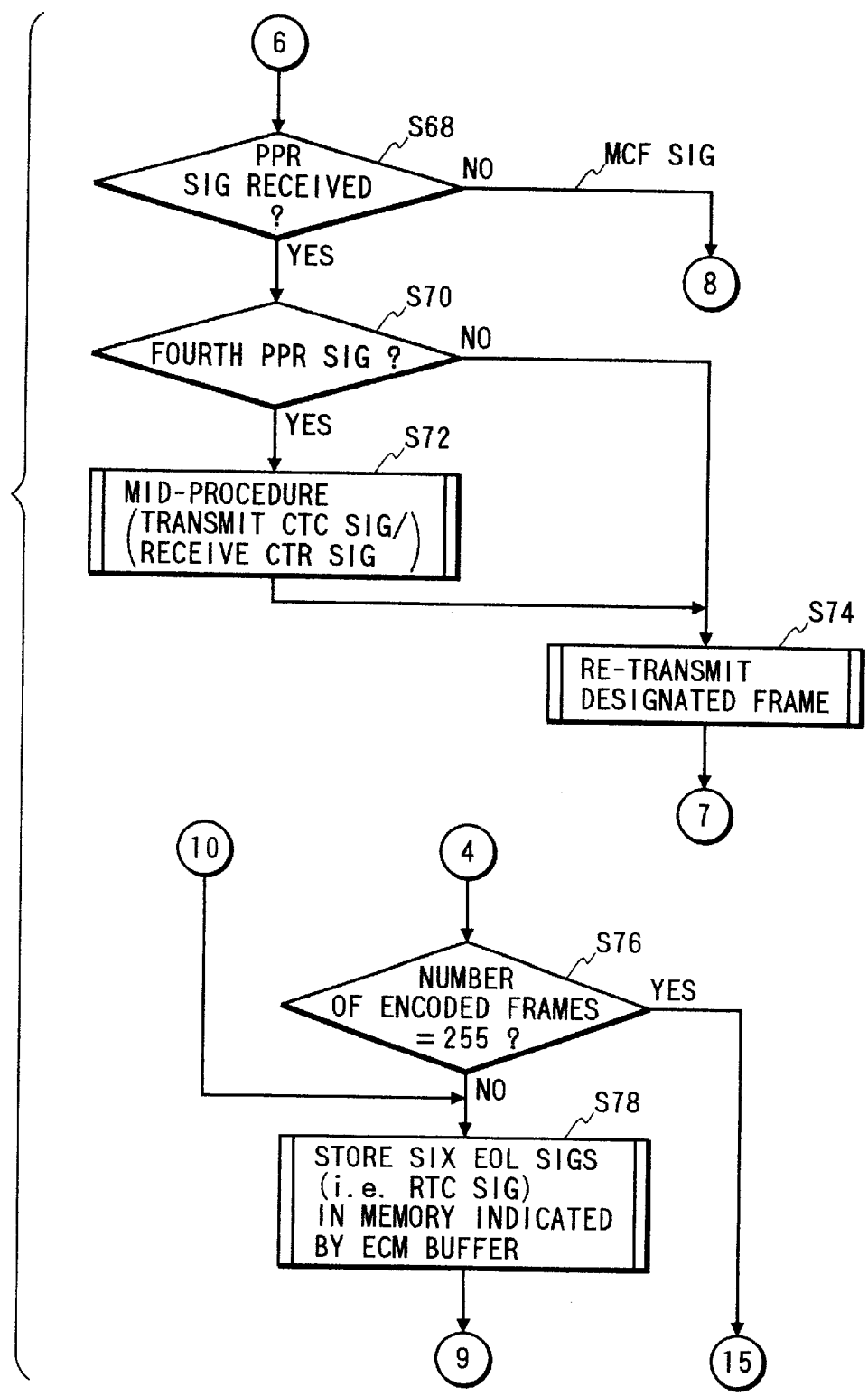
FIG. 5 is a flow chart showing the operation according to the first embodiment of the present invention.
Figure 6:
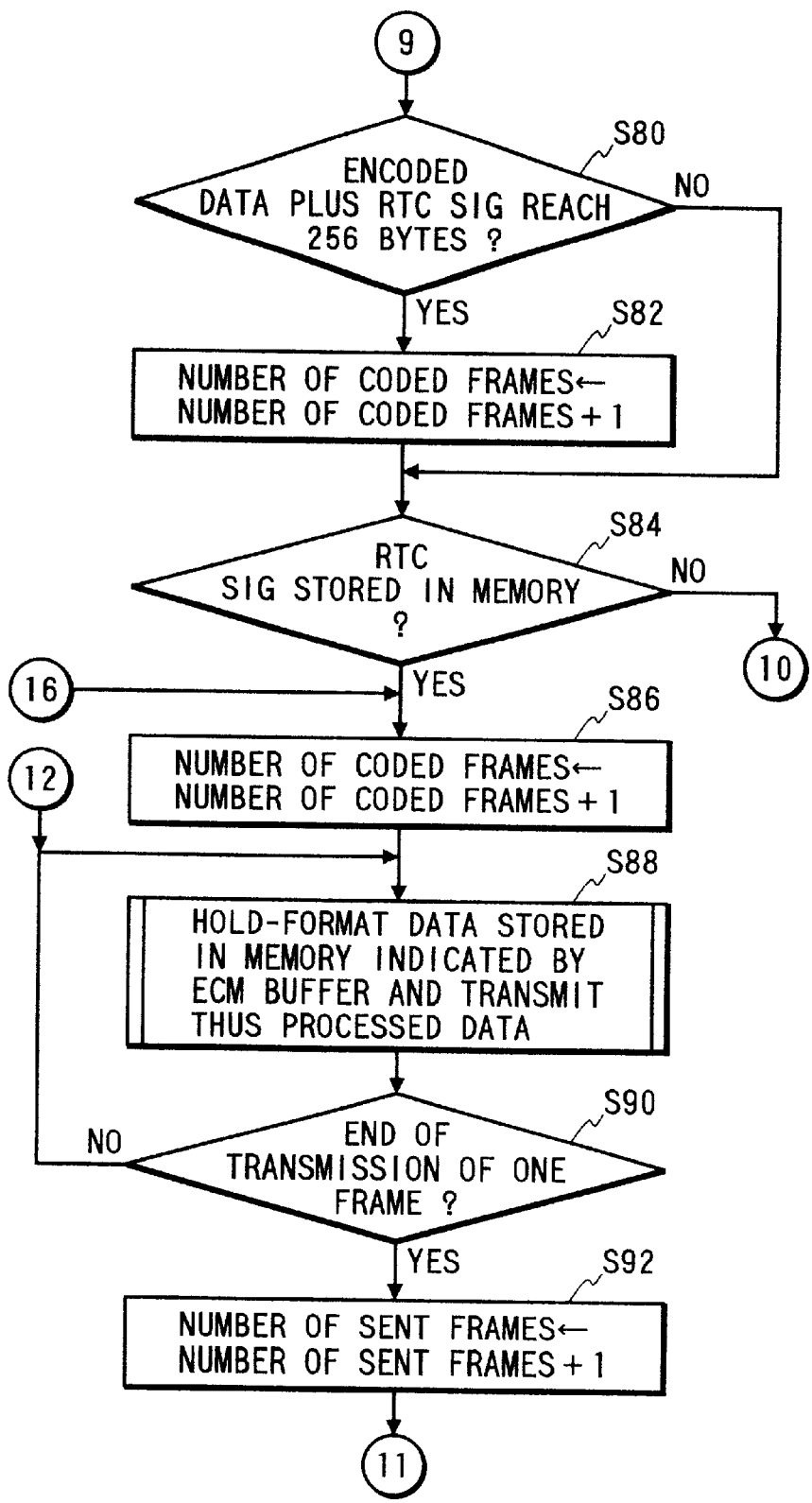
FIG. 6 is a flow chart showing the operation according to the first embodiment of the present invention.
Figure 7:
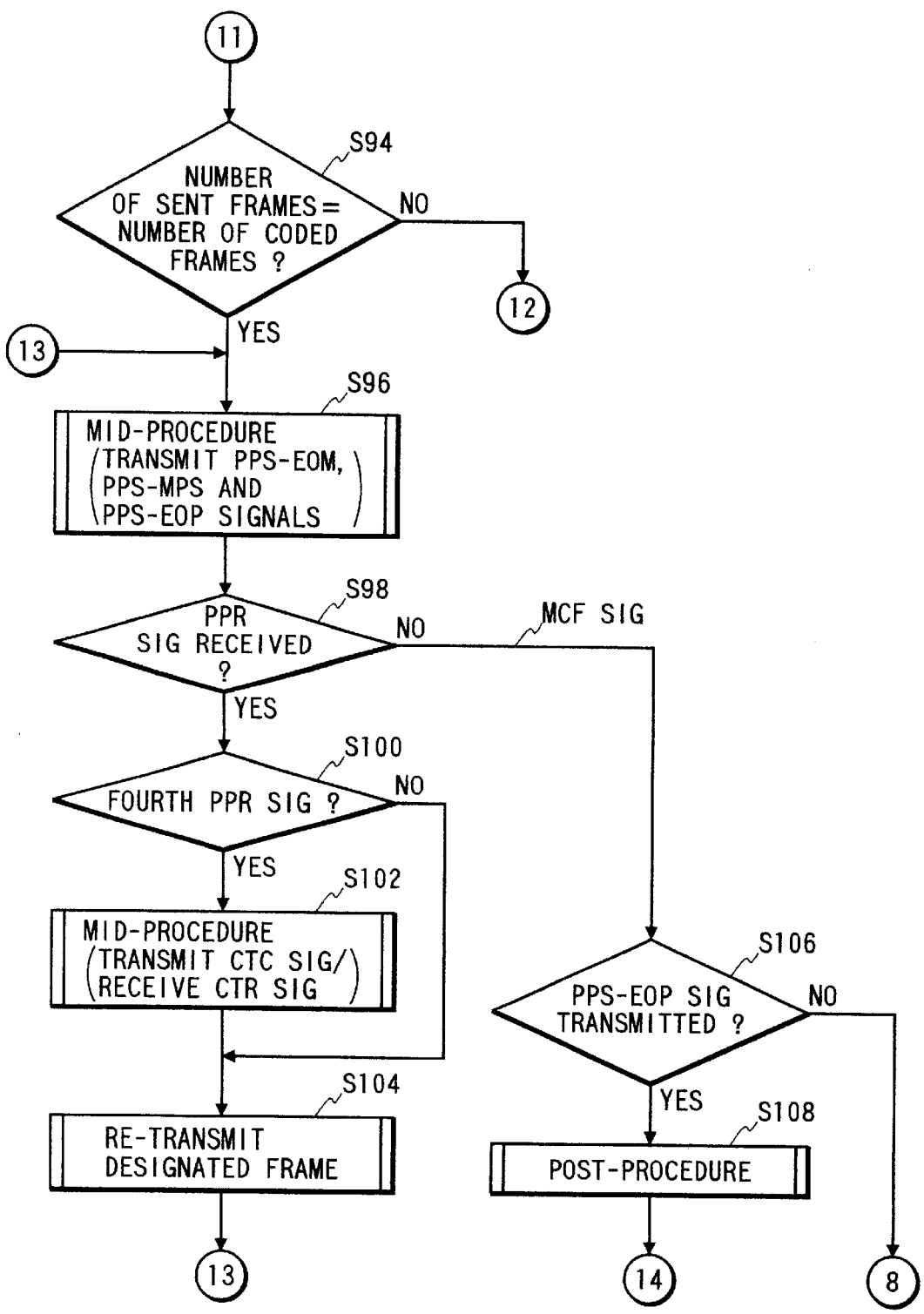
FIG. 7 is a flow chart showing the operation according to the first embodiment of the present invention.
Figure 8:
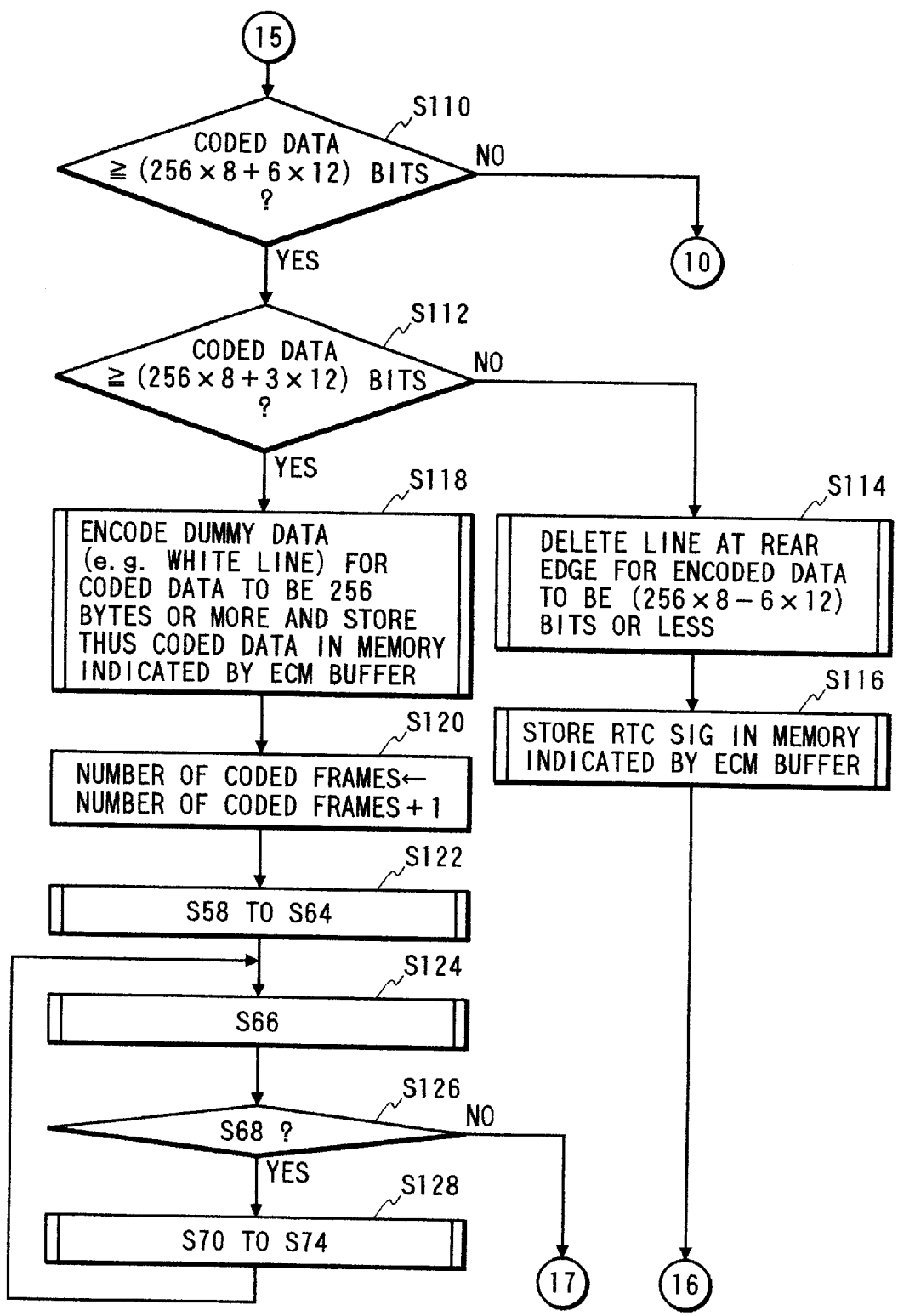
FIG. 8 is a flow chart showing the operation according to the first embodiment of the present invention.
Figure 9:
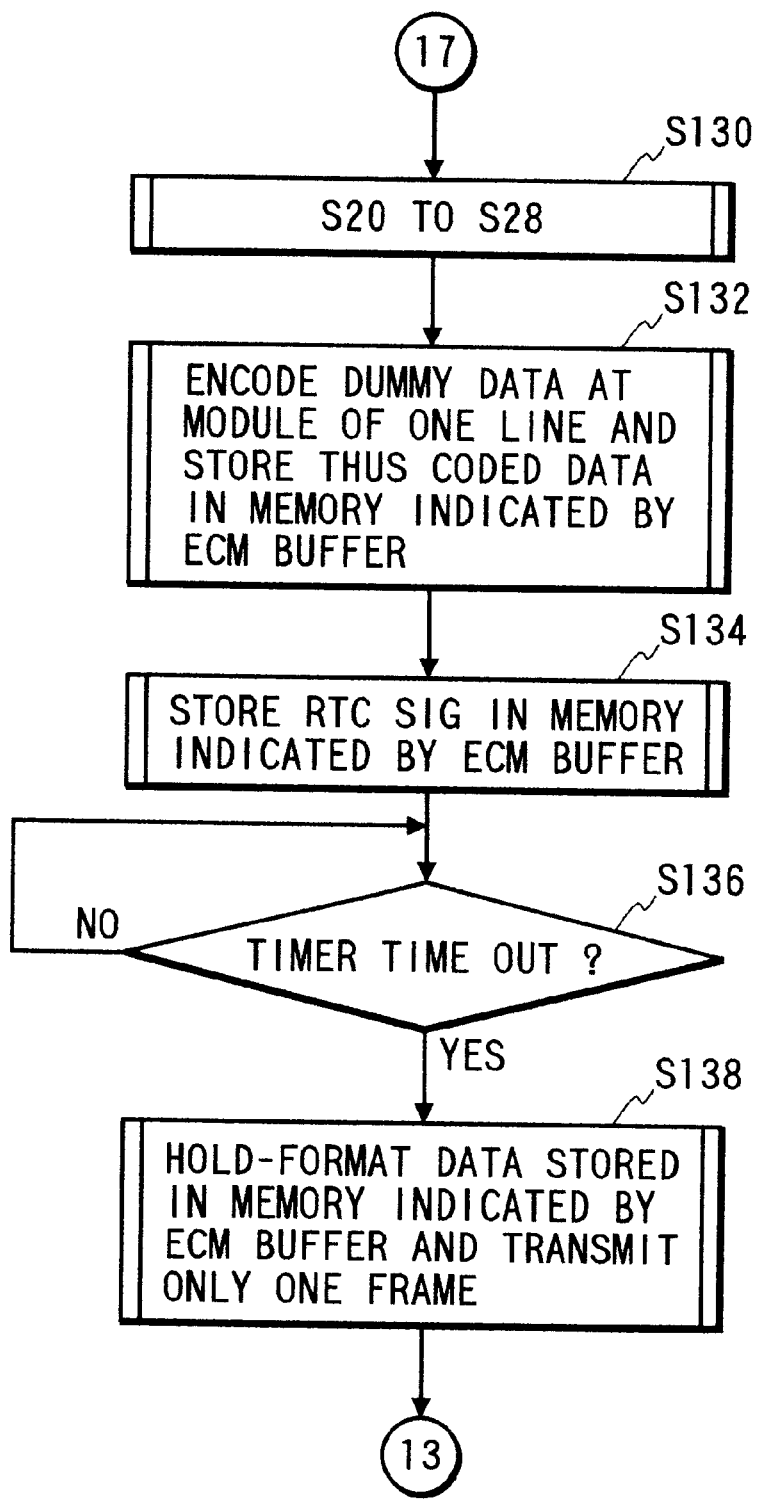
FIG. 9 is a flow chart showing the operation according to the first embodiment of the present invention.

FIG. 1 is a block diagram showing the arrangement of a facsimile apparatus according to an embodiment of the present invention.

An NCU (network, control unit) 2 connects a terminal on a telephone network' performs connection control of a telephone exchange network, switches to a data communication path and holds a loop so as to use the network in data communications and the like. The NCU 2 connects a telephone line 2a to the side of a telephone set 4 if the signal level (signal line 20a) from a control circuit 20 is "0"; and connects the telephone line 2a to the facsimile apparatus side if the signal level is "1". Normally, the telephone line 2a is connected to the telephone set 4 side.

A hybrid circuit 6 separates the transmission system signal from a reception system signal. The hybrid circuit 6 sends a transmission signal from an adder circuit 12 onto the telephone line 2a via the NCU 2. Also, the hybrid circuit 6 receives a signal from a partner apparatus via the NCU 2, and sends the received signal to a modem 8 via a signal line 6a.

The modem 8 performs modulation and demodulation based on the ITU-T recommendations V.8, V.21, V27ter, V.29, V.17, and V.34, and each transmission mode is designated by a signal line 20c. The modem 8 receives a signal output onto a signal line 20b, and outputs modulated data onto a signal line 8a. Also, the modem 8 receives a reception signal output onto a signal line 6a, and outputs demodulated data onto a signal line 8b.

An ANSam send-out circuit 10 sends out an ANSam signal. When a signal of signal level "1" is output onto a signal line 20d, the circuit 10 sends out an ANSam signal onto a signal line 10a; when a signal of signal level "0" is output onto the signal line 20d, the circuit 10 does not output any signal onto the signal line 10a.

The adder circuit 12 receives information on the signal line 8a and that on the signal line 10a, and outputs the sum onto a signal line 12a. A reading circuit 14 reads an original image, and outputs the read image data onto a signal line 14a. A recording circuit 16 records information output onto a signal line 20e sequentially in units of lines.

A memory circuit 18 is used for storing raw information of the read data or encoded information, or storing received information, decoded information, or the like.

The control circuit 20 performs the following control processes in ECM communications especially in the first embodiment of the present invention. When an ECM communication mode is selected, the control circuit 20 performs control for encoding image information and transmitting 256 bytes as one frame and 256 frames as one block. When information has a volume exceeding one block, the control circuit 20 transmits the remaining information as a next partial page. In this case, the control circuit 20 checks a volume of the information for one physical page. When an RTC signal has such volume of information that may be divided into two blocks, the control circuit 20 transmits information while preventing the RTC signal from being divided into two blocks by deleting or adding information.

FIGS. 2 to 9 are flow charts showing such control flow of the control circuit 20 in the first embodiment.

In step S0, the control circuit 20 starts its operation. In step S2, the control circuit 20 outputs a signal of signal level "0" onto the signal line 20a to turn off a CML. In step S4, the control circuit 20 outputs a signal of signal level "0" onto the signal line 20d to disable sending-out of an ANSam signal.

In step S6, the control circuit 20 checks if transmission is selected. If YES in step S6, the flow advances to step S10; otherwise, the flow advances to step S8 to execute other processes. After that, the flow returns to step S2.

In step S10, the control circuit 20 outputs a signal of signal level "1" onto the signal line 20a to turn on the CML. The control circuit 20 performs a pre-procedure in step S12, and checks in step S14 if the partner station has an ECM reception function. If YES in step S14, the flow advances to step S20; otherwise, the flow advances to step S16.

In step S16, the control circuit 20 modulates information obtained by encoding an image signal and then adding an RTC signal, and transmits the modulated information in a normal G3 mode. The control circuit 20 performs a post-procedure in step S18, and the flow then returns to step S2.

In step S20, the control circuit 20 sets 250 ms in a timer. With this time, a flag of 250 ms is initially transmitted. That is, the control circuit 20 starts transmission of the flag in step S22.

In step S24, the control circuit 20 sets "0" in a sent frame counter for counting the number of sent frames. In step S26, the control circuit 20 sets "0" in a coded frame counter for counting the number of coded frames.

In step S28, the control circuit 20 sets "0" in an ECM buffer. In this embodiment, only transmission is made, and the ECM buffer always uses "0". The ECM buffer stores 256 frames, i.e., 64-Kbyte data.

In step S30, the control circuit 20 encodes image information by a designated coding scheme, and stores the encoded image information in a memory designated by the ECM buffer. In step S32, the control circuit 20 checks if the timer has reached a time-out state. If NO in step S32, the flow advances to step S34; otherwise, the flow advances to step S38.

In step S34, the control circuit 20 checks if 256 bytes have been encoded. If YES in step S34, the flow advances to step S36, and the coded frame counter is incremented by "1". The flow then returns to step S30. On the other hand, if NO in step S34, the flow directly returns to step S30.

The control circuit 20 checks in step S38 if the contents of the coded frame counter have exceeded those of the sent frame counter. If YES in step S38, the flow advances to step S42; otherwise, the flow advances to step S40 to transmit a flag. The flow then advances to step S48.

In step S42, the control circuit 20 converts the information stored in the memory designated by the ECM buffer into an HDLC format, and transmits the converted information. The control circuit 20 then checks in step S44 if transmission for one frame is complete. If YES in step S44, the flow advances to step S46, and the sent frame counter is incremented by "1". The flow then advances to step S48. On the other hand, if NO in step S44, the flow directly advances to step S48.

In step S48, the control circuit 20 encodes image information by a designated coding scheme, and stores the encoded image information in the memory designated by the ECM buffer. The control circuit 20 then checks in step S50 if reading of an image signal has ended. If YES in step S50, the flow advances to step S76; otherwise, the flow advances to step S52.

The control circuit 20 checks in step S52 if 256 bytes have been encoded. If NO in step S52, the flow returns to step S38; otherwise, the flow advances to step S54 to increment the coded frame counter by "1". Then, the flow advances to step S56.

The control circuit 20 checks in step S56 if the contents of the coded frame counter indicate 256. If NO in step S56, the flow returns to step S38; otherwise, the flow advances to step S58.

In step S58, the control circuit 20 converts the information stored in the memory designated by the ECM buffer into an HDLC format, and transmits the converted information. The control circuit 20 then checks in step S60 if transmission for one frame is complete. If NO in step S60, the flow returns to step S58.

On the other hand, if YES in step S60, the flow advances to step S62, and the sent frame counter is incremented by "1". In step S64, the control circuit 20 checks if the contents of the sent frame counter indicate 256. If YES in step S64, the flow advances to step S66; otherwise, the flow returns to step S58.

In step S66, the control circuit 20 performs a mid-procedure. In this case, the control circuit 20 transmits a PPS-NULL signal. The control circuit 20 checks in step S68 if a PPR signal or MCF signal is received. If the PPR signal is received, the flow advances to step S70; if the MCF signal is received, the flow returns to step S20.

The control circuit 20 checks in step S70 if the received PPR signal is the 4th PPR signal. If YES in step S70, the flow advances to step S72; otherwise, the flow advances to step S74.

In step S72, the control circuit 20 performs a mid-procedure. In this case, the control circuit 20 transmits a CTC signal, and receives a CTR signal. In step S74, the control circuit 20 re-transmits the designated frame, and the flow returns to step S66.

The control circuit 20 checks in step S76 if the contents of the coded frame counter indicate 256. If NO in step S76, since an RTC signal never extends across two blocks, i.e., two partial pages, the flow advances to step S78; otherwise, the flow advances to step S110.

In step S78, the control circuit 20 stores six EOL signals, i.e., an RTC signal, in the memory designated by the ECM buffer. The control circuit 20 then checks in step S80 if the total of the encoded information and RTC signal (some or all) has reached 256 bytes. If YES in step S80, the flow advances to step S82 to increment the coded frame counter by "1"; otherwise, the flow advances to step S84.

The control circuit 20 checks in step S84 if the RTC signal is stored in the memory. If YES in step S84, the flow advances to step S86; otherwise, the flow returns to step S78.

In step S86, the control circuit 20 increments the coded frame counter by "1". In step S88, the control circuit 20 converts the information stored in the memory designated by the ECM buffer into an HDLC format, and transmits the converted information.

The control circuit 20 then checks in step S90 if transmission for one frame is complete. If YES in step S90, the flow advances to step S92 to increment the sent frame counter by "1"; otherwise, the flow returns to step S88.

The control circuit 20 checks in step S94 if the number of sent frames equals the number of coded frames. If YES in step S94, the flow advances to step S96; otherwise, the flow returns to step S88.

In step S96, the control circuit 20 performs a mid-procedure. In this case, the control circuit 20 transmits one of PPS-EOM, PPS-MPS, and PPS-EOP signals. The control circuit 20 then checks in step S98 if a PPR signal or MCF signal is received. If the PPR signal is received, the flow advances to step S100; if the MCF signal is received, the flow advances to step S106.

The control circuit 20 checks in step S100 if the received PPR signal is the 4th PPR signal. If YES in step S100, the flow advances to step S102 to execute transmission of a CTC signal/reception of a CTR signal in a mid-procedure, and the flow then advances to step S104. On the other hand, if NO in step S100, the flow directly advances to step S104. In step S104, the control circuit 20 re-transmits the designated frame, and the flow returns to step S96.

The control circuit 20 checks in step S106 if a PPS-EOP signal has been transmitted. If YES in step S106, the flow advances to step S108 to execute a post-procedure; if NO in step S106, i.e., if a PPS-MPS or PPS-EOM signal has been transmitted, the flow returns to step S20.

The control circuit 20 checks in step S110 if encoded data equal to or larger than (256×8−6×12) bits are stored in the memory. If YES in step S110, since an RTC signal cannot be fully contained in this block, the flow advances to step S112; otherwise, since an RTC signal is fully contained in this block, the flow returns to step S78. Note that one block has 256×8 bits, and the RTC signal has 6×12 bits.

The control circuit 20 checks in step S112 if encoded data equal to or larger than (256×8−3×12) bits are stored in the memory. If YES in step S112, the flow advances to step S118; otherwise, the flow advances to step S114.

In step S114, the control circuit 20 deletes line information at the trailing edge so as to transmit the RTC signal within this partial page. In step S116, the control circuit 20 stores the RTC signal in the memory designated by the ECM buffer, and the flow returns to step S86.

In step S118, the control circuit 20 encodes dummy data (e.g., white line) so that the encoded data has 256 bytes, and stores the encoded dummy data in the memory designated by the ECM buffer. In step S120, the control circuit 20 increments the coded frame counter by "1".

The control circuit 20 executes the control processes of steps S58 to S64, that of step S66, and those of step S68 sequentially in steps S122, 124, and S126, respectively. Furthermore, the control circuit 20 executes the control processes of steps S70, S72, and S74, and those of steps S20 to S28 sequentially in steps S128 and S130, respectively, and the flow then advances to step S132.

In step S132, the control circuit 20 encodes dummy data at the middle of one line, and stores the encoded dummy data in the memory designated by the ECM buffer. In step S134, the control circuit 20 stores the RTC signal in the memory designated by the ECM buffer.

The control circuit 20 waits in step S136 until the timer reaches a time-out state. If YES in step S136, the flow advances to step S138. In step S138, the control circuit 20 converts the information stored in the memory designated by the ECM buffer into an HDLC format, and transmits only one frame. More specifically, in this case, the volume of information stored in the memory falls within one frame. After that, the flow returns to step S96.

The second embodiment of the present invention will be explained below.

The second embodiment adds information so that the block may include encoded information for at least one line in the first embodiment.

Figure 10:
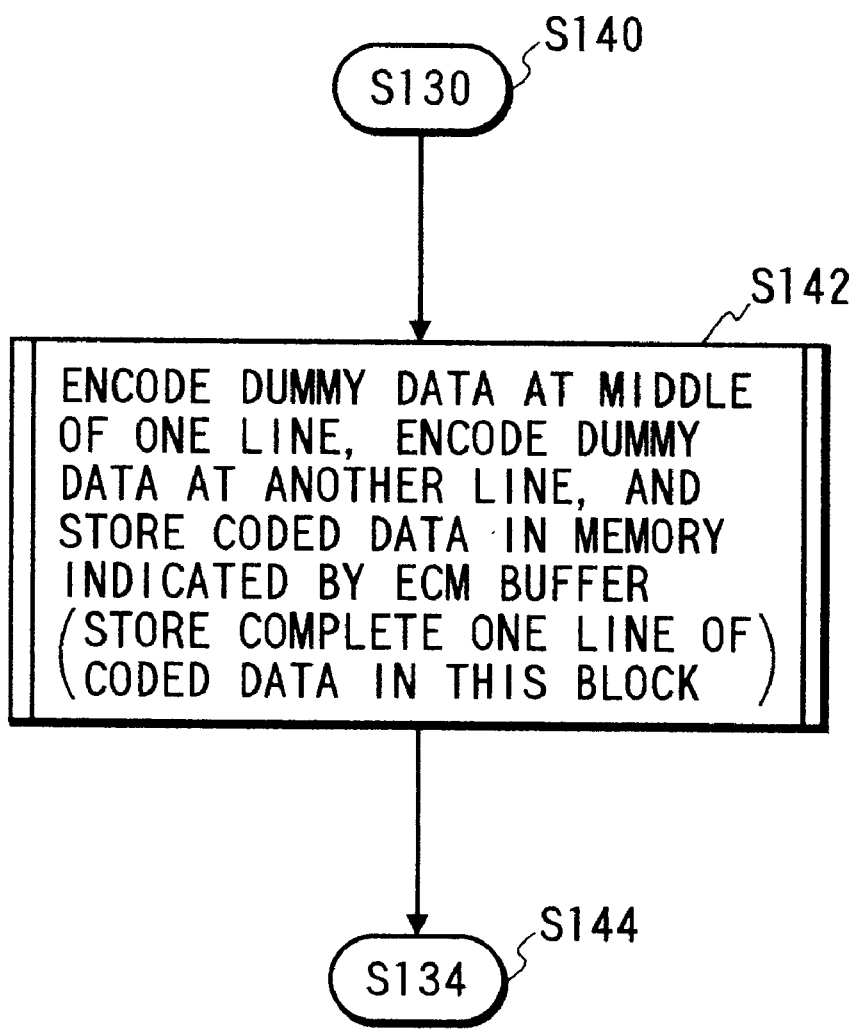
FIG. 10 is a flow chart showing the operation according to the second embodiment of the present invention.

FIG. 10 is a flow chart showing the steps different from those in the first embodiment (FIGS. 2 to 9) in the control operation of the second embodiment.

In FIG. 10, step S140 corresponds to step S130. In step S142, the control circuit 20 encodes dummy data at the middle of one line, also encodes dummy data for another line, and stores these data in the memory designated by the ECM buffer. More specifically, in this embodiment, it is important to store encoded data for one complete line in this block. After that, the flow advances to step S134 via step S144.

The above embodiments have exemplified facsimile communications complying with the ITU-T recommendations V.8 and V.34. Also, the present invention can be applied to various other communication apparatuses based on communication protocols having functions equivalent to such recommendations.

The above embodiments have exemplified a stand-alone type facsimile apparatus. However, the present invention is not limited to such specific apparatus. That is, the present invention can also be applied to data communication control in a multi-functional data processing system including a copy function, an electronic filing function, and a combination of a data processing function and communication function.

As described above, according to the first and second embodiments, for example, an RTC signal can be prevented from being divided into two blocks, i.e., two partial pages and, hence, errors arising from such divided RTC signals can be prevented. Therefore, communications can be continued.

According to the second embodiment, when an RTC signal or the like extends over two blocks, one physical page is transmitted as two partial pages by adding information so that the RTC signal or the like is contained in the second partial page, whereby the second partial page always contains encoded information for one line, and thus the receiver can reliably receive the second partial page, and can continue communications.

What is claimed is:

1. A communication apparatus for executing an ECM communication, said apparatus comprising:
    a transmission control circuit adapted for, when an ECM transmission mode is selected, transmitting a predetermined number of bytes of information to be transmitted as one frame, and transmitting a predetermined number of frames as one block, and for, when a volume of information is equal to or greater than one block, transmitting information beyond one block as a next partial page; and
    an information processing circuit adapted for checking an information volume for one physical page of the information to be transmitted, and for, when the information volume for one physical page is a specific information volume, deleting or adding information from or to the information to be transmitted.

2. An apparatus according to claim 1, wherein said information processing circuit deletes or adds information from or to the information to be transmitted so as to prevent a signal, indicating start of transmission of a control signal, from being divided into two blocks.

3. An apparatus according to claim 2, wherein the signal, indicating the start of transmission of the control signal, is an RTC signal complying with an ITU-T recommendation.

4. An apparatus according to claim 1, wherein the information to be transmitted is image information, and said transmission control circuit forms one frame using the predetermined number of bytes obtained by encoding the image information.

5. An apparatus according to claim 4, wherein the information added by said information processing circuit is added to a block to obtain encoded information for at least one line.

6. A communication method for executing an ECM communication, said method comprising the steps of:

transmitting a predetermined number of bytes of information to be transmitted as one frame, and transmitting a predetermined number of frames as one block when an ECM transmission mode is selected;

transmitting information beyond one block as a next partial page when a volume of information is equal to or greater than one block;

checking an information volume for one physical page of the information to be transmitted; and deleting or adding information from or to the information to be transmitted when the information volume for one physical page is a specific information volume.

7. A method according to claim 6, wherein said step of deleting or adding prevents a signal, indicating start of transmission of a control signal, from being divided into two blocks.

8. A method according to claim 7, wherein the signal, indicating the start of transmission of the control signal, is an RTC signal complying with an ITU-T recommendation.

9. A method according to claim 6, wherein the information to be transmitted is image information, and said step of transmitting a predetermined number of bytes forms one frame using the predetermined number of bytes obtained by encoding the image information.

10. A method according to claim 8, wherein the information added in said deleting or adding step is added to a block to obtain encoded information for at least one line.

* * * * *